UNITED STATES PATENT OFFICE 2,494,002

CREAMING OF MIXTURES OF SYNTHETIC RUBBER LATICES OF DIFFERENT AVERAGE PARTICLE SIZES

John S. Rumbold, New Haven, Conn., assignor to United States Rubber Company, New York, N. Y., a corporation of New Jersey No Drawing. Application January 11, 1946, Serial No. 640,688

6 Claims. (Cl. 260—85.1)

This invention relates to improvements in the creaming of synthetic rubber latices.

Synthetic rubber latices, as is known, may be prepared by the emulsion polymerization in an aqueous medium of butadienes-1,3 or mixtures of butadienes-1,3 with other polymerizable compounds capable of forming copolymers with butadienes-1,3. Such aqueous emulsion polymerizates, or synthetic rubber latices, may be creamed by the addition of a hydrophilic colloidal creaming agent, such as is used for creaming natural rubber latex, which will cause the dispersion on standing to separate into a polymer-rich fraction and a polymer-poor fraction, which fractions may be separated from each other by simple mechanical means, such as decantation, drawing-off, and the like.

By the present invention, there is obtained an increase in the concentration of synthetic rubber in the polymer-rich or cream fraction in the creaming of synthetic rubber latices with hydrophilic colloidal creaming agents.

In carrying out the present invention, a mixture of a plurality of synthetic rubber latices of different average particle sizes is creamed with a hydrophilic colloidal creaming agent. I have discovered that if latices of different average particles sizes are mixed together, the composite latex can be creamed, as with a vegetable mucilage, to a higher solids concentration than the individual constituent latices. Latices of different average particle size may be obtained in several ways. Conventional present-day methods of preparing synthetic rubber latex gives latices of average particle diameter of about .1 micron (from about .07 micron to about .10 micron) measured by the light scattering method, as, for example, with a photo-volt Lumetron colorimeter measuring the intensity of the light scattered at an average angle of 90° to the incident beam. The light scattering method is believed more accurate than the electron microscope method of determining particle size. The electron microscope gives high results which may be ascribed to a slight agglomeration during the drying preparatory to taking the picture, and also possibly to a flattening of the particles during the exposure, due to the rubber globules being pressed down by the electron stream. The average particle size as expressed herein is the diameter of the particle of average volume, and in all cases is measured by the light scattering method. Such conventional synthetic rubber latices of average particle diameter from about .07 to about .10 micron, may be readily agglomerated to an average particle diameter from about .2 micron up to 1 micron or more without coagulation of the latex by adding a salt to the latex. A mixture of a portion of such conventionally prepared latex having an average particle diameter of about .1 micron with a portion of the same latex agglomerated to an average particle diameter of about .2 micron or higher, will cream to a higher solids content than either the original or the agglomerated latex alone. In general, the difference in average particle diameter of at least two of the constituent latices of the mixture should be at least .05 micron. In using a conventional present-day commercial synthetic rubber latex as one of the constituent latices of the mixture to be creamed, the average particle diameter of such latex will generally be about .1 micron and the average particle diameter of one or more of the other constituent latices should be at least .15 micron. Another method of obtaining latices of large particle size is to add a small amount of salt to the original emulsion of the monomeric materials before polymerization. One may then mix the latices made with and without the addition of salt to the original emulsion to obtain the high solids content cream by the present invention. Latices of different particle size may also be prepared by varying the conditions of the same agglomerating process, as for example, in the formation of a salt in situ in the synthetic rubber latex. For example, the latex may be made acid, and then alkali added to form a salt in situ. Different average particle size latices may be obtained by varying the length of time after acidification and before addition of the alkali. Different amounts of added stabilizer, and different stabilizers will give latices of different average particle sizes on the incorporation in the latex of the same amount of salt. If desired, the agglomerating process may be repeated on a previously agglomerated sample to give a latex of still larger average particle size. The synthetic rubber latices of different average particle sizes may be aqueous emulsion polymerizates of the same or chemically different polymeric materials.

The hydrophilic colloidal creaming agent may be one of the conventional vegetable mucilages used in the creaming of natural latex, for example, alginates, locust seed or carob bean gum, pectates, karaya gum, Irish moss, and the like. These vegetable mucilages may be used in amounts between .05 to 1% based on the water phase of the synthetic rubber latex, similarly to the creaming of natural rubber latex.

In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3. The polymerizable material as known may be a mixture of such a butadiene-1,3 with another polymerizable compound which is capable of forming rubbery copolymers with butadienes-1,3, for example, up to 70 per cent of such mixture of a compound which contains a

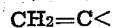

group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubbers of the above types are polymerized chloro-2-butadiene-1,3, known as neoprene or GR-M rubber, copolymers of butadiene-1,3 and styrene, known as Buna S or GR-S rubber, and copolymers of butadiene-1,3 and acrylonitrile, known as Buna N or GR-A rubber.

The following examples are illustrative of the present invention, all parts recited therein being parts by weight:

Example I

A commercial 37.9 per cent solids GR-S latex was prepared by polymerizing an aqueous emulsion of 50 parts of butadiene-1,3 and 50 parts of styrene with 5 parts of sodium abietate and 1 part of the condensation product of sodium naphthalene sulfonate and formaldehyde (commercially sold as Daxad 11) as emulsifying agents, .3 part of potassium persulfate as a conventional catalyst and .5 part dodecyl mercaptan as conventional regulator in 140 parts of water. The emulsion was polymerized by agitating at about 50° C. for 18 hours after which unpolymerized butadiene was vented off and unpolymerized styrene was removed by steam distillation. The average particle diameter of the latex was .10 micron.

A portion of the GR-S latex was aggregated by adding to 1904 parts (wet weight) of the latex 496 parts (wet weight) of an aqueous solution which contained 5.3 parts of ammonium bicarbonate, .5 part of sodium lauryl sulfate (commercial Aquarex D emulsifying and stabilizing agent) and 1.6 parts of potassium soap of coconut oil acids per 100 parts of total solids of the latex. The thus treated latex was allowed to stand 30 hours at about 25° C., at which time the average particle diameter was found to be .20 micron. The agglomeration was stopped by adding 139 parts (wet weight) of an aqueous solution which contained 3.8 parts of potassium hydroxide per 100 parts of total solids of the latex. The addition of the potassium hydroxide did not significantly change the average particle diameter of .2 micron.

Samples of the original GR-S latex having an average particle diameter of .10 micron, and of the agglomerated latex having an average particle diameter of .20 micron, and of various mixtures of the original and agglomerated latices were creamed for one day with ammonium alginate as the creaming agent over a range of concentrations of the ammonium alginate to find the maximum solids concentrations of the various creams at the optimum concentration of creaming agent.

The results are shown in the following table:

| Per Cent Original Latex of Aver. Part. Diam. of .10 Micron | Per Cent Aggregated Latex of Aver. Part. Diam. of .20 Micron | Aver. Part. Diam. before Creaming (microns) | Total Solids of Latex before Creaming, Per Cent | Optimum Concentration of Ammonium Alginate (Per Cent on Water Phase before Creaming) | Maximum Cream solids, Per Cent |
|---|---|---|---|---|---|
| 100 | 0 | .10 | 37.9 | .16 | 47.0 |
| 55 | 45 | .15 | 34.3 | .22 | 55.6 |
| 45 | 55 | .16 | 33.5 | .23 | 56.6 |
| 35 | 65 | .17 | 32.8 | .26 | 58.2 |
| 30 | 70 | .17 | 32.5 | .21 | 58.5 |
| 0 | 100 | .20 | 30.6 | .12 | 39.3 |

In the creaming of the mixtures as shown in the above table, the average particle diameter of the mixtures is at least .05 micron greater than the average particle diameter of the component latex of smallest average particle size.

Example II

A 36 per cent solids GR-S latex was prepared by polymerizing an aqueous emulsion of 75 parts of butadiene-1,3 and 25 parts of styrene with 5 parts of potassium abietate as an emulsifying agent, 1 part of potassium persulphate and .5 part dodecyl mercaptan in 150 parts of water. The emulsion was polymerized by agitating at 65° C. for 28 hours, after which unpolymerized butadiene was vented off and unpolymerized styrene was removed by steam distillation.

Various samples of the GR-S latex were creamed, using various amounts of ammonium alignate from .1 to .2 per cent based on the water content of the latex. The maximum solids content of the creams was 47.3 per cent. A portion of the latex was agglomerated with ammonium bicarbonate by adding .2 per cent ammonia and saturating the thus treated latex with carbon dioxide until the pH reached an equilibrium value of 7.2. The thus treated latex was whiter and more opaque than the original latex, showing the larger particle size by virtue of the agglomerating treatment with ammonium bicarbonate. The latex was further stabilized by the addition of 2 per cent dimethylamine laurate and .3 per cent ammonia, both based on the latex solids. The maximum cream solids of the thus treated latex of larger particle size with various amounts of ammonium alginate as the creaming agent was 49.7 per cent. A mixture of equal parts of the untreated and treated latices creamed with various amounts of ammonium alginate creaming agent gave a maximum cream solids content of 57.9 per cent, showing a great increase in the solids content of the cream of the mixture over the solids content of the creams of the constituent latices.

of ammonia as shown in the table below before passing in carbon dioxide. In this way five samples of different average particle size were prepared. A composite latex was made by mixing equal proportions of the five samples. The composite latex and the five differently agglomerated latex samples were creamed with various amounts of ammonium alginate and the maximum cream solids determined in each case. The results of the creaming tests are summarized in the table below:

| Sample | Percent Ammonia Added (Based on Water Phase) | Equilibrium pH on Addition of $CO_2$ | Percent Coagulum Filtered Off (Based on Latex Solids) | Percent Solids Content at Start of Creaming | Maximum Cream Solids, (Percent) |
|---|---|---|---|---|---|
| 1 | 0.59 | 7.0 | 0.7 | 25.3 | 48.3 |
| 2 | .69 | 7.2 | 1.0 | 26.4 | 51.2 |
| 3 | .77 | 7.2 | 3.3 | 24.0 | 52.6 |
| 4 | .85 | 7.4 | 10.3 | 24.7 | 53.4 |
| 5 | .94 | 7.4 | 12.0 | 24.1 | 53.0 |
| Composite (Equal parts of samples 1 to 5) | | | | 24.9 | 58.1 |

*Example III*

A 33.6 per cent GR-S latex was prepared by polymerizing an aqueous emulsion of 50 parts of butadiene-1,3 and 50 parts of styrene with 2.5 parts of the ammonium soap of coconut oil fatty acids, .3 part ammonium persulphate, .25 part of dodecyl mercaptan, and .1 part of ammonia in 180 parts of water.

A portion of the above latex was diluted from 33.6 per cent to 30 per cent solids and agglomerated with ammonium bicarbonate by adding .5 per cent ammonia based on the total weight of latex and saturating it with carbon dioxide. The equilibrium pH was 7.2. The latex of increased average particle size thus obtained was stabilized by adding .1 per cent dimethylamine and 3 per cent dimethylammonium laurate based on the solids content, and heated to between 85 and 90° C. by passing steam directly into the latex to decompose and drive off the volatile carbonates. A small amount of coagulum formed was filtered off and the latex solids was 24 per cent. The thus agglomerated latex gave a maximum cream solids of 52.6 per cent on creaming with various amounts of ammonium alginate.

A second sample was prepared in the same manner as above but with the addition of .6 per cent ammonia instead of .5 per cent ammonia based on the total weight of latex before saturating with carbon dioxide, thus increasing the concentration of ammonia bicarbonate and hence increasing the average particle size of the latex over that agglomerated on the addition of .5 per cent ammonia followed by the carbon dioxide treatment. This latex had a solids content of 24.6 per cent. On creaming with various amounts of ammonium alginate, a maximum cream solids of 53.4 per cent was obtained.

Equal portions of the two agglomerated latices above were mixed together and creamed with various amounts of ammonium alginate. The maximum cream solids of the mixture was 57.4 per cent, which is considerably higher than the maximum cream solids of either of the component agglomerated latices.

*Example IV*

Samples of the same GR-S latex as was used in Example III were treated in a similar way to those in Example III by adding various amounts It may readily be seen from the above examples that mixtures of latices of different average particle sizes give much higher solids content creams with conventional creaming methods than the component latices of the mixture.

This application is a continuation-in-part of my application Serial No. 576,139, filed February 3, 1945, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The improvement in the creaming with hydrophilic colloidal creaming agents of synthetic rubber latices comprising aqueous emulsion polymerizates of polymerizable material selected from the group consisting of butadienes-1,3 and mixtures of butadienes-1,3 with up to 70% of said mixture of material which contains a $CH_2=C<$ group and is copolymerizable with butadienes-1,3 which comprises creaming with a hydrophilic colloidal creaming agent a mixture of such emulsion polymerizates of the same polymerizable chemical material of different average particle sizes such that the average particle diameter of the mixture is at least .05 micron greater than the average particle diameter of the component emulsion polymerizate of smallest average particle size, the average particle diameters of the component emulsion polymerizates being from .07 to 1 micron.

2. The improvement in the creaming with hydrophilic colloidal creaming agents of synthetic rubber latices comprising aqueous emulsion polymerizates of polymerizable material selected from the group consisting of butadienes-1,3 and mixtures of butadienes-1,3 with up to 70% of said mixture of material which contains a $CH_2=C<$ group and is copolymerizable with butadienes-1,3 which comprises creaming with a hydrophilic colloidal creaming agent a mixture of one such emulsion polymerizate having an average particle diameter of .07 to .10 micron and another such emulsion polymerizate of the same polymerizable chemical material having an average particle diameter of .2 to 1 micron, the average particle diameter of the mixture of emulsion polymerizates being at least .15 micron.

3. The improvement in the creaming with vegetable mucilages of aqueous emulsion polymerizates of mixtures of butadiene-1,3 and up to 70% of said mixture of material which contains a $CH_2=C<$ group and is copolymerizable with butadene-1,3 which comprises creaming with a vegetable mucilage a mixture of such emulsion polytables mucilages of aqueous emulsion polymer-material of different average particle sizes such that the average particle diameter of the mixture is at least .05 micron greater than the average particle diameter of the component emulsion polymerizate of smallest average particle size, the average particle diameters of the component emulsion polymerizates being from .07 to 1 micron.

4. The improvement in the creaming with vegetable mucilages of aqueous emulsion polymerizates of mixtures of butadiene-1,3 and up to 70% of said mixture of material which contains a $CH_2=C<$ group and is copolymerizable with butadiene-1,3 which comprises creaming with a vegetable mucilage a mixture of one such emulsion polymerizate having an average particle diameter of .07 to .10 micron and another emulsion polymerizate of the same polymerizable chemical material having an average particle diameter of .2 to 1 micron, the average particle diameter of the mixture of emulsion polymerizates being at least .15 micron.

5. The improvement in the creaming with vegetable mucilages of aqueous emulsion polymerizates of mixtures of butadiene-1,3 and up to 70% of the mixture of styrene which comprises creaming with a vegetable mucilage a mixture of such emulsion polymerizates of different average particle sizes such that the average particle diameter of the mixture is at least .05 micron greater than the average particle diameter of the component emulsion polymerizate of smallest average particle size, the average particle diameters of the component emulsion polymerizates being from .07 to 1 micron.

6. The improvement in the creaming with vegetable mucilages of aqueous emulsion polymerizates of mixtures of butadiene-1,3 and up to 70% of the mixture of styrene which comprises creaming with a vegetable mucilage a mixture of one such emulsion polymerizate having an average particle diameter of .07 to .10 micron and another such emulsion polymerizate having an average particle diameter of .2 to 1 micron, the average particle diameter of the mixture of emulsion polymerizates being at least .15 micron.

JOHN S. RUMBOLD.

REFERENCES CITED

The following references are of record in the file of this patent:

UNITED STATES PATENTS

| Number | Name | Date |
|---|---|---|
| 2,357,861 | Willson | Sept. 12, 1944 |

OTHER REFERENCES

Pages 33–35 and 41, article by Mueller, India Rubber World, vol. 107, October 1942.

Certificate of Correction

Patent No. 2,494,002 January 10, 1950

JOHN S. RUMBOLD

It is hereby certified that errors appear in the printed specification of the above numbered patent requiring correction as follows:

Column 2, line 6, for "idameter" read *diameter*; column 7, lines 2, 17, and 31, and column 8, line 11, before "aqueous" insert *synthetic rubber latices comprising*; same column 7, line 8, strike out the words and syllable "tables mucilages of aqueous emulsion polymer-" and insert instead *merizates of the same polymerizable chemical*; and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*